United States Patent [19]

Bowman

[11] Patent Number: 4,790,872

[45] Date of Patent: Dec. 13, 1988

[54] ADDITIVE FOR PROMOTING SLAG FORMATION IN STEEL REFINING LADLE

[75] Inventor: Bradford C. Bowman, Ancaster, Canada

[73] Assignee: Hamilton Specialty Bar Division of Slater Industries, Inc., Hamilton, Canada

[21] Appl. No.: 145,549

[22] Filed: Jan. 19, 1988

[51] Int. Cl.$^4$ ............................ C22B 4/00; C21C 5/52
[52] U.S. Cl. .................................................. 75/10.58
[58] Field of Search ............................ 75/10.58, 49, 24

[56] References Cited

U.S. PATENT DOCUMENTS

| 3,884,678 | 5/1975 | Iyengar | 75/52 |
| 3,964,899 | 6/1976 | Jones et al. | 75/53 |
| 4,010,023 | 3/1977 | Bowden | 75/24 |
| 4,036,635 | 7/1977 | Klapdar | 75/49 |
| 4,050,925 | 9/1977 | Johnson | 75/30 |
| 4,127,399 | 11/1978 | Oikawa | 65/19 |
| 4,137,071 | 1/1979 | Mrdjenovich | 75/30 |
| 4,177,070 | 12/1979 | Krupman et al. | 75/257 |
| 4,200,452 | 4/1980 | Savov | 75/49 |
| 4,460,164 | 7/1984 | Tivelius | 75/49 |

FOREIGN PATENT DOCUMENTS 1255646 12/1984 U.S.S.R. .

Primary Examiner—Peter D. Rosenberg
Attorney, Agent, or Firm—Ridout & Maybee

[57] ABSTRACT

In ladle refining of steel a molten protective slag covering is used consisting of iron blast furnace slag, or of a mixture of solid burnt lime and/or burnt dolomitic lime together with iron blast furnace slag in an amount effective to serve as a flux promoting the melting of the lime and dolomitic lime. The iron blast furnace slag avoids the environmentally harmful emissions caused by use of fluorspar as a flux. It forms a quicker melting slag, resulting in lower power usage and shorter refining times. It forms a final slag with good physical properties. There is considerable reduction of wear of the ladle and roof refractories and carbon pick up from the ladle refining electrodes is minimized.

13 Claims, No Drawings

ADDITIVE FOR PROMOTING SLAG FORMATION IN STEEL REFINING LADLE

In recent years ladle refining has become a fairly common practice in steel making. In such refining, a charge of molten steel is refined in a ladle beneath a protective covering of synthetic slag, while the charge is heated using carbon electrodes immersed in the slag covering.

The charge of steel to be refined may be obtained from, for example, the basic oxygen furnace (bof) or from the open hearth furnace, wherein iron, tapped from the iron blast furnace, optionally together with scrap steel, is furnaced to form a steel and a primary slag. The slag contains impurities such as sulfur and phosphorus absorbed from the iron during the steel making process and is usually discarded. The steel thus obtained can be used as the starting material steel in the ladle refining process. Alternatively, the starting material steel may be obtained by melting steel scrap in an electric arc furnace into which oxygen and sources of carbon may also be injected in order to speed up the melting process. The melt in this case is also formed in the presence of a primary slag which is likewise usually discarded.

Ladle refining, when employed, is used to bring the steel to a desired final condition. The molten steel from the bof, open hearth or arc furnace is tapped substantially slag-free into a ladle, or the slag is removed subsequently to tapping the steel in the ladle, in which it resides during the ladle furnacing operation. In the event that oxidizable alloying agents such as ferro-chrome, ferro-silicon, ferromanganese or the like are to be added, the charge of steel is first killed by addition of deoxidizing agents in order to reduce the oxygen content from the highly oxidized condition in which the steel is obtained from the bof, open hearth or arc furnace.

A synthetic slag forming material is placed in the top of the molten steel in the ladle. The slag, once formed, serves to protect the steel together with its alloying agents from air oxidation and captures materials released from or formed in the treatment of the steel in the ladle, such as non-metallic inclusions. The slag may also absorb materials such as sulfur from the steel. Usually, the slag forming material comprises lime, namely burnt lime (CaO), burnt dolomitic lime (CaO +MgO) or a mixture thereof, typically in the form of lumps about 1 inch in size, which are added in an amount to form, when molten, a layer of slag about 3 to 6 inches thick. Carbon electrodes are introduced into the pile of lumps of lime and are adjusted in position until they are about 2 inches above the surface of the molten steel. It is important to avoid contact of the electrodes with the metal to avoid uncontrolled contamination of the steel with carbon dissolved from the electrodes. A current is then supplied to the electrodes, typically at a power dissipation rate of several megawatts, in order to melt the lime to form a slag.

During treatment of the steel in the ladle, it is maintained hot, and is reheated if necessary, by gentle stirring of the steel in order to facilitate heat transfer between it and the heated slag, and in order to render the steel homogeneous, without substantially disturbing the continuity of the covering of slag. The stirring also serves to encourage capture of non-metallic inclusions in the slag. The steel may be subjected to further treatments such as the addition of alloying ingredients, and degassing in order to reduce its hydrogen content.

The lime and dolomitic lime used as the slag forming materials are refractory and tend to be difficult and slow to melt. As a result of the slow melting of the slag forming materials, a number of disadvantages arise. Until the slag is fluid it does not form an effective protective covering and therefore the steel is exposed to oxidation until the slag is formed. The longer the period during which the carbon electrodes need to be operated in order to melt the lime materials, the greater the pick up of carbon contamination by the steel from the electrodes. A long period of melting also results in increased electrode wear and in undesirably high power consumption. Further, the time needed for refining a given charge of steel is increased, so that the process is rendered time consuming and more expensive. The carbon electrodes, operating at a temperature of the order of 10,000° C. cast a very high temperature flare until the electrode tips become submerged in the fluid slag, and the heat incident on the brick lining of the inner sides of the ladle and on the surrounding roof or other support structures result in wear of the refractory brick materials and in wear and oxidation of any exposed metal surfaces, thus resulting in expenses because of the need for more frequent shut downs for renewal of the brick and metal surfaces.

In order to facilitate the melting of the lime materials, fluorspar, $CaF_2$, has in the past been added to the solids as a flux. Fluorspar is highly effective in promoting the melting of the lime and in reducing the time required for an effective slag covering to be formed. However, the use of fluorspar results in environmentally harmful fluorine-containing emissions and its use has had to be discontinued in a number of localities.

The discontinuance of the use of fluorspar and the unavailability of any satisfactory replacement for fluorspar has resulted in the above noted difficulties associated with melting the lime material being encountered, to the great detriment of the economics of operating ladle refining processes.

There has therefore been a need for a flux or other additive to promote the melting of the lime in the ladle furnace.

In order to function satisfactorily, a flux for the melting of the lime should be compatible with the slag and with the brick lining of the ladle. It should therefore desirably be chemically neutral so that it will not alter the basicity usually desired for the slag and will not render the slag prone to corrode or attack the material of the brick lining, usually dolomitic brick, at least adjacent to and below the slag line. It should desirably be neither significantly oxidizing nor reducing so that it will not disturb the desirable mildly reducing environment maintained in the ladle furnace. Moreover, it should desirably be substantially free of impurities such as carbon and hydrogen which can contaminate or contribute to undesired properties in the steel. Further, since the slag has an economic value as an aggregate, the flux should not impair the physical or chemical properties of the slag such as by forming a falling slag which forms a friable powdery slag on cooling, or by presenting a significant content of leachable alkalis or other solubles. Lastly, it should be inexpensive at least in the amounts needed to adequately promote melting of the lime materials.

Proposals have been made for the use of materials having a high content of alumina, $Al_2O_3$, as a flux in oxidizing steel making furnaces. As far as the applicant is aware, however, there has been no prior proposal of a satisfactory flux for accelerating the melting of lime in a ladle furnace. Since alumina is itself a highly refractory material, it would not provide as adequate a reduction in melting time as is desirable in ladle furnace operation.

In one aspect of the present invention, iron blast furnace slag is employed as an additive to the lime and/or dolomitic lime materials in a steel refining ladle in order to promote melting of the lime by current passed to carbon electrodes immersed in the lime. It has been found that iron blast furnace slag is highly effective in reducing the time taken to form a slag from a given quantity of lime, and is at least as effective as fluorspar in this regard. Although larger weights of the iron blast furnace slag need to be employed, its ready availability and low cost as compared with fluorspar, and its compatibility with the ladle lining and with the chemistry of the ladle furnace process make it readily possible to use substantial amounts of iron blast furnace slag without any detriment to the economy of the process and without effecting the control of the process or the quality of the products. In particular iron blast furnace slag is substantially neutral, that is its basicity is approximately 1.0 (typically in the range 0.8 to 1.3), owing to its conditions of production, and it is non-oxidizing and typically mildly reducing in character. It is free from any substantial content of carbon or hydrogen. It has been found that it forms a slag with good chemical and physical properties from the point of view of marketability of the slag obtained as a by product of the steel refining process, and, in particular it does not form a falling slag. Typically, iron blast furnace slag melts in the range of about 1200° C. to about 1400° C., more typically about 1250° C. to about 1350° C., and therefore melts readily at the temperature at which the steel is maintained in the ladle (typically about 1500° C. to about 1800° C., more typically about 1600° C. to 1700° C.). Although the manner or mechanism with which the iron blast furnace slag functions to promote the rapid melting of the lime is not at present completely understood, it is believed that, when added as a solid, the iron blast furnace slag initially melts and then functions as a solvent dissolving the much more refractory lime solids such as CaO having a melting point of about 2600° C.

In the preferred form of the present invention, the iron blast furnace slag is employed as a flux in admixture with lime, since usually it is desired to desulfurize the steel and a basic lime slag exerts a beneficial desulfurizing action. However, it is contemplated within the present invention that the synthetic slag formed on the steel may consist substantially wholly of iron blast furnace slag added on top of the charge of steel to be refined in the ladle. Such slag is non-desulfurizing and is useful in the production of, for example, resulfurized steel having a content of 0.060 to 0.3% by weight sulfur. When a synthetic slag consisting wholly of iron blast furnace slag is employed, it may be desirable to employ a ladle lined with brick selected to be chemically compatible with the substantially neutral slag, in order to avoid corrosion of the brick, since the usual brick lining is intended to be compatible with a predominantly lime based slag having a basicity of about 1.5 to about 2. For the avoidance of doubt "basicity" herein refers to the molar ratio of CaO+MgO to SiO$_2$+Al$_2$O$_3$, that is:

$$\frac{CaO + MgO}{SiO_2 + Al_2O_3} \text{ (molar concentrations)}$$

Accordingly, the present invention provides a process of ladle refining of steel, comprising disposing in a ladle a quantity of molten steel to be refined, adding a material forming a molten protective slag covering on the steel in the ladle, heating at least a region of the slag with electric current passed to carbon electrodes immersed in the slag, gently stirring the steel to allow it to be heated by heat transfer from the heated region without substantially disturbing the continuity of the protectable slag covering and to substantially homogenize the steel, and subsequently discharging the heated and homogenized steel from the ladle, wherein the improvement comprises a material forming a molten protective slag consisting essentially of iron blast furnace slag, or of a mixture of solid particulate burnt lime and/or of burnt dolomitic lime with iron blast furnace slag in an amount effective to serve as a flux promoting the melting of the lime and dolomitic lime.

As noted above, in the preferred form, the slag forming material comprises a mixture of burnt lime and/or dolomitic lime together with iron blast furnace slag as a flux. This slag forming material may be added on the top of the steel after it has been tapped into the ladle, or may be added to the steel during the process of tapping the steel into the ladle. Desirably the amount of the iron blast furnace slag used is about 10 to about 80% by weight based on the total weight of the said mixture. If quantities less than about 10% are employed, the time required for melting the solid lime particles becomes excessively long, and the problems discussed above come to the fore. If greater than about 80% by weight of the mixture comprises iron blast furnace slag, the synthetic slag resulting tends to be insufficiently basic to effect adequate desulfurization of the steel and is therefore undesirable except in those instances where desulfurization is not required. More preferably the amount of the iron blast furnace slag is about 20 to about 60%, still more preferably about 50%, by weight, based on the total weight of the mixture.

Desirably, the mixture of burnt lime and burnt dolomitic lime comprises about 10 to about 40% by weight of MgO and the balance CaO, since CaO/MgO mixtures containing amounts of MgO outside this range tend to have higher melting points and tend to take longer to melt to form a fluid slag than mixtures within the above range. More preferably, the mixture will contain about 30% MgO and the balance CaO. It is, however, possible, although not preferable, to employ a synthetic slag forming mixture consisting wholly of iron blast furnace slag together with non-dolomitic lime (CaO) since a substantial content of MgO is present in the blast furnace slag and this content tends to facilitate the melting of the lime.

In the case in which the ladle refining operation is conducted at a station conveniently close to an iron blast furnace, the present process may be conducted by running molten slag taken from the blast furnace direct to the ladle furnace. In most cases, however, it will be more convenient to control the quantity of iron blast furnace slag added to the synthetic slag forming mixture by adding the iron blast furnace slag in the form of a measured quantity of solid iron blast furnace slag particles. The carbon electrodes are immersed in the particulate mixture before passing current between the electrodes in order to melt the mixture to form a molten slag.

Advantageously, the solid iron blast furnace slag particles are of a particle size having at least 90% by weight, based on the total weight of the particles, in the range from about ⅛ to ¾ inch. If the particles are much smaller than about ⅛ inch, they tend to give rise to problems in handling and may give rise to a dust nuisance. Particles much above about ¾ inch in size present a relatively small surface area and tend to melt correspondingly more slowly. More preferably, the particles are at least 90% by weight in the size range about ¼ to about ½ inch. Pelletized iron blast furnace slag in hhe above size range is commercially available in the form of pelletized waterquenched iron blast furnace slag, and is conventionally used in cement making. For use in the present invention, the pelletized slag must of course be carefully dried so that it is substantially anhydrous before being brought into contact with the molten steel in the refining ladle.

Typically, the iron blast furnace slag employed in the present invention will be characterised by consisting essentially of the following in percentages by weight based on the total weight of the composition:

CaO: about 30 to about 45%
SiO$_2$: about 35 to about 45%
MgO: about 5 to about 15%
Al$_2$O$_3$: about 5 to about 15% together with about 0 to about 2% each of P, Na, K, and Mn, about 1 to about 2% S and about 1 to about 4% Fe (normally present as both iron metal and FeO). Such composition has been found to be compatible with the typical ladle lining materials and to rapidly form a slag, especially in admixture with burnt lime and/or dolomitic lime, excellently suited for use in the ladle refining operation, while yielding a final by product slag of excellent chemical and physical properties.

Desirably, for the purposes of the present process, the blast furnace slag has its basicity

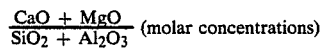

$$\frac{CaO + MgO}{SiO_2 + Al_2O_3} \text{ (molar concentrations)}$$

between about 0.8 and about 1.3. Such basicity allows the blast furnace slag material to be mixed with the preferred lime and dolomitic lime materials to yield a synthetic slag having an advantageous basicity for the purposes of ladle refining. More preferably the basicity is about 1. Iron blast furnace slags having the above composition and basicity range can be readily obtained from commercial iron blast furnace operations.

As noted above, during the refining operation, the steel melt is gently stirred in order to promote heat transfer between the steel and the slag. The stirring of the steel is conducted in such a manner that the continuity of the protective slag cover is not substantially disturbed, so that the slag preserves the steel from air oxidation. An exception is that on occasion the stirring may be conducted in a manner to cause temporarily a small opening in the slag covering, through which pieces of alloying metal compounds such as ferrochrome, ferronickel or the like or other additives may be dropped direct into the molten steel. The stirring may be conducted using conventional procedures, for example by introducing an inert gas e.g., argon, into the bottom of the ladle, or by electromagnetic stirring. It is convenient to express the rate of energy dissipation employed in stirring, i.e. the stirring energy applied in unit time, in standard terms by referring to the energy dissipation rate as being equivalent to that achieved by introducing a given flow rate of inert gas into the bottom of the ladle. Thus, preferably the stirring energy dissipation rate is equivalent to an inert gas flow rate of about 0.02 about 0.2 cu ft/min per ton (2000/lbs) of steel maintained in the ladle. More preferably, the energy dissipation rate of the stirring is equivalent to such flow rate being about 0.06 cu ft/min per ton.

While the above description provides ample information allowing the skilled reader to carry out the process of the invention, for the avoidance of doubt a detailed Comparative Example and an Example in accordance with the invention will be given.

COMPARATIVE EXAMPLE 60 tons of slag free molten steel was placed in a 60 ton capacity ladle lined with dolomitic brick and with high alumina brick above the slag line, and equipped with a porous argon-introducing brick and with a slide gate tapping nozzle in the bottom. The steel was at a temperature of 2800° F. (1540° C.) and had the following composition (percentages by weight)

C: 0.5
Mn: 0.6
Cr: 0.6
Si: 0.2
Fe: Balance 750 lbs burnt lime (CaO) and 750 lbs of dolomitic lime, of MgO:CaO weight ratio 40:60, each in 1 inch lumps were added on the top of the steel.

Three carbon electrodes 14 inch in diameter supported in a brick-lined roof member were lowered together with the roof member over the mouth of the ladle until the lower ends of the electrodes were about 2 inches above the steel. An electric current was passed between the electrodes, dissipating electrical power of from 6 to 8 megawatts.

In different runs it took from about 20 to about 30 minutes before the lime mixture was fluidized to form a slag.

EXAMPLE

The above procedure was repeated identically except that instead of the mixture of burnt lime and dolomitic lime, a modified mixture was employed. This modified mixture consists of 750 pounds of a mixture of equal parts by weight of lumps of the burnt lime and dolomitic lime, and 750 pounds dried, pelletized iron blast furnace slag (more than 90% by weight in the size range ¼ to ½ inch) of the following composition (percentages by weight):

CaO: 31.21
Al$_2$O$_3$: 9.58
MgO: 12.1
SiO$_2$: 40.1
S: 1.07
MnO: 0.9
FeO: 3.1

(balance traces of P, Na and K)

In this case, the slag was fully melted and formed in less than 5 minutes.

It may be mentioned that, following the formation of the slag, the steel was stirred by applying 4 cu ft/min argon through the porous brick and was reheated to 2900° F. (1590° C.) in order to provide heat to melt the alloying agents added subsequently. The stirring was then stopped and the steel was analyzed. Conventional alloying agents were added to bring the compositon to that of, for example, 5160 steel (0.55-0.64 C, 0.7-0.9 Mn, 0.6-1.0 Cr, 0.2-0.35 S:, balance Fe), the steel was stirred again using 4 cu ft/min argon and was exited to a continuous billet casting unit.

The slag was recovered from the ladle and was cooled to yield a solid slag having excellent chemical and physical properties rendering it useful as aggregate.

I claim:

1. A process of ladle refining of steel, comprising disposing in a ladle a quantity of molten steel to be refined, adding a material forming a molten protective slag covering on the steel in the ladle, heating at least a region of the slag with electric current passed to carbon electrodes immersed in the slag, gently stirring the steel to allow it to be heated by heat transfer from said heated region without substantially disturbing the continuity of the protective slag covering, and to substantially homogenize the steel, and subsequently discharging the heated and homogenized steel from the ladle, wherein the improvement comprises said material forming a molten protective slag consisting essentially of iron blast furnace slag, or of a mixture of solid particulate burnt lime or burnt dolomitic lime, or both, with iron blast furnace slag in an amount effective to serve as a flux promoting the melting of said lime and dolomitic lime, and wherein said iron blast furnace slag consists essentially of the following in percentages by weight based on the total weight of the slag:

CaO: about 30 to about 45%
SiO2: about 35 to about 45%
MgO: about 5 to about 15%
Al2O3: about 5 to about 15% together with about 0 to 2% each of P, Na, K and Mn, about 1 to about 2% S, and about 1 to about 4% Fe.

2. The improvement as claimed in claim 1 wherein said material comprises a mixture of burnt lime and/or burnt dolomitic lime with iron blast furnace slag in an amount of about 10 to 80% by weight based on the total weight of the mixture.

3. The improvement as claimed in claim 2 wherein said mixture is added on the top of said steel in the form of a solid particulate mixture, and electrodes are immersed in said mixture before passing current between electrodes in order to melt said mixture to form a molten slag.

4. The improvement as claimed in claim 2 wherein said amount is about 20 to about 60% by weight.

5. The improvement as claimed in claim 4 wherein said amount is about 50% by weight.

6. The improvement as claimed in claim 2 wherein said mixture of burnt lime and burnt dolomitic lime comprises about 10 to about 40% MgO by weight and the balance CaO.

7. The improvement as claimed in claim 6 wherein said mixture comprises about 30% by weight MgO and the balance CaO.

8. The improvement as claimed in claim 1 wherein said slag has its basicity $$\frac{CaO + MgO}{SiO_2 + Al_2O_3} \text{ (molar concentrations)}$$

between about 0.8 to 1.3.

9. The improvement as claimed in claim 8 wherein said basicity is about 1.

10. The improvement as claimed in claim 1 wherein said slag comprises dried pelletised solid iron blast furnace slag particles of which at least 90% by weight is in the size range $\frac{1}{8}$ to $\frac{3}{4}$ inch.

11. The improvement as claimed in claim 10 wherein said particles are at least 90% by weight in the size range $\frac{1}{4}$ to $\frac{1}{2}$ inch.

12. The improvement as claimed in claim 1 wherein said gentle stirring is applied with an energy dissipation rate equivalent to introducing inert gas into the bottom of the ladle at a flow rate of about 0.02 to about 0.2 cu ft/min per ton of steel maintained in the ladle.

13. The improvement as claimed in claim 12 wherein said flow rate is about 0.067 cu ft/min per ton of the steel.

* * * * *